(12) United States Patent
Zeng et al.

(10) Patent No.: US 7,912,154 B2
(45) Date of Patent: Mar. 22, 2011

(54) BASEBAND PROCESS METHOD BASED ON DOUBLING SAMPLING

(75) Inventors: Zhaohua Zeng, Shenzhen (CN); Hai Jiang, Shenzhen (CN); Ping Li, Shenzhen (CN); Hongfeng Qin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 864 days.

(21) Appl. No.: 11/883,188

(22) PCT Filed: Jan. 31, 2005

(86) PCT No.: PCT/CN2005/000135
§ 371 (c)(1),
(2), (4) Date: Jul. 27, 2007

(87) PCT Pub. No.: WO2006/079253
PCT Pub. Date: Aug. 3, 2006

(65) Prior Publication Data
US 2008/0310553 A1    Dec. 18, 2008

(51) Int. Cl.
*H04L 27/06* (2006.01)

(52) U.S. Cl. ........................................ 375/340

(58) Field of Classification Search ............... 375/340, 375/219, 316, 354, 295, 148, 130; 455/418; 370/342
See application file for complete search history.

(56) References Cited

U.S. PATENT DOCUMENTS

| 2002/0037058 A1* | 3/2002 | Birru | 375/340 |
| 2003/0215004 A1* | 11/2003 | Vihriala | 375/148 |

* cited by examiner

*Primary Examiner* — Khai Tran

(57) ABSTRACT

A baseband processing method based on double sampling, including: subjecting a received signal to root raised cosine-filtering process; sampling said signal; conducting channel estimation for every user based on the sampled data; and conducting multi-user joint detection and demodulation for said data. Wherein, the step of sampling said signal includes the following steps: conducting double sampling for said signal, and the interval of the sampling being ½ chip; each chip selecting the average value of two sampling values as the sampling value of the chip; assembling the sampling value of every chip into a data stream. According to the present invention, in the case that the complexity of computation is not increased and only the memory space is doubled, the gain of the received signal in the system is improved effectively, especially when the synchronization of signals is bad, relatively large gain of the signals can be obtained, the system delay is reduced, and the real-time property of signal processing is improved. The method according to the present invention is suitable to the mobile communication system in a bad communication environment.

6 Claims, 3 Drawing Sheets

BASEBAND PROCESS METHOD BASED ON DOUBLING SAMPLING

CROSS REFERENCE TO RELATED APPLICATIONS OR PRIORITY CLAIM

This application is a national phase and claims priority to International Application No. PCT/CN2005/000135, entitled "Baseband Process Method Based On Doubling Sampling", which was filed on Jan. 31, 2005 and which was not published in English.

FIELD OF THE INVENTION

The present invention relates to a baseband processing method of a TDD-CDMA system and a SCDMA system, and specifically, relates to a baseband processing method of the TD-SCDMA system.

BACKGROUND ART

The TD-SCDMA system is a time division synchronous code division multiple access system, wherein the synchronization requires that the time that the uplink signals of all activated user apparatuses working at the same time slot in a cell reach the base station of the cell are generally the same, thus the interference between adjacent time slots can be reduced, and a relatively high signal-to-noise ratio can be kept when a digital receiver conducts sampling.

However, in the actual TD-SCDMA system, even a synchronization control algorithm is used, the time that the signals from all user equipments to the base station cannot be completely the same, but the purpose of reducing the interferences between adjacent time slots can be achieved as long as the differences between the times that the signals from all the user equipments to the base station are controlled within an allowable range (such as the width of several chips). But this can not guarantee that a digital receiver, when conduct sampling, can keep a relatively big signal-to-noise ratio, because a tiny difference (such as within the width of one chip) between the time that the signals from all the user equipments to the base station can greatly reduce the signal-to-noise ratio at the time that the digital receiver conducts sampling, thereby reducing the performance of the whole system.

SUMMARY

The present invention is proposed based on the above problem in the prior art and it aims to provide a baseband processing method based on double sampling, in order to improve the performance of the system when the synchronization of the uplink signals is not good.

The baseband processing method based on double sampling according to the present invention includes: subjecting received signals to root raised cosine-filtering process; sampling said signals; conducting channel estimation for every user based on the sampled data; and conducting multi-user joint detection and demodulation for said data. Wherein, the step of sampling said signals includes the following steps: conducting double sampling to said signals, and the sampling interval being ½ chip; each chip selecting the average value of two sampling values as the sampling value of the chip; and assembling the sampling values of every chip into a data stream.

Preferably, the step of conducting the root raised cosine-filtering process further comprises: filtering and de-multiplexing the received signals; sampling each chip for $2^{(M-1)}$ times, and then rendering the values of $2^{(M-1)}$ fractional chips, wherein M is a natural number.

Preferably, the step of conducting the double sampling further comprises: selecting anyone of the $2^{(M-1)}/2$ preceding fractional chips of the first chip as a sampling point; conducting sampling every ½ chip with considering the position of a sampling point as a standard.

Preferably, the step of conducting the channel estimation further comprises: separating a training sequence from the data stream; obtaining the channel impulsive responses of a user according to the training sequence; and conducting channel post-process to the channel impulsive responses.

Preferably, the step of conducting channel post-process further comprises: judging whether the power of each tap of the channel impulsive responses is not less than a set threshold value; if not less than, keeping the impulsive response at the position where the tap is; otherwise, setting the impulsive response at the position where the tap is as zero.

Preferably, the step of conducting the multi-user detection and demodulation for the data further comprises: generating a system transmission matrix by using the respective scrambling codes for spectrum spreading and the channel impulsive responses of the users; and jointly detecting and demodulating the user data by using the system transmission matrix.

By adopting the present invention, the gain of the received signals of the system is improved without increasing the complexity of computation while only the storage space is increased by one fold, and especially, relatively big gain can be obtained when the signal synchronization is bad, the system delay is reduced, and real-time property of processing the signals can be improved. The present invention can be applied to the mobile communication system in a bad communication environment.

BRIEF DESCRIPTION OF THE ACCOMPANYING DRAWINGS

DETAILED DESCRIPTION OF THE EMBODIMENTS

The above and other objects, features and advantages of the present invention will be more apparent through the following detailed description of the embodiments of present invention in conjunction with the accompanying drawings.

Figure 1:
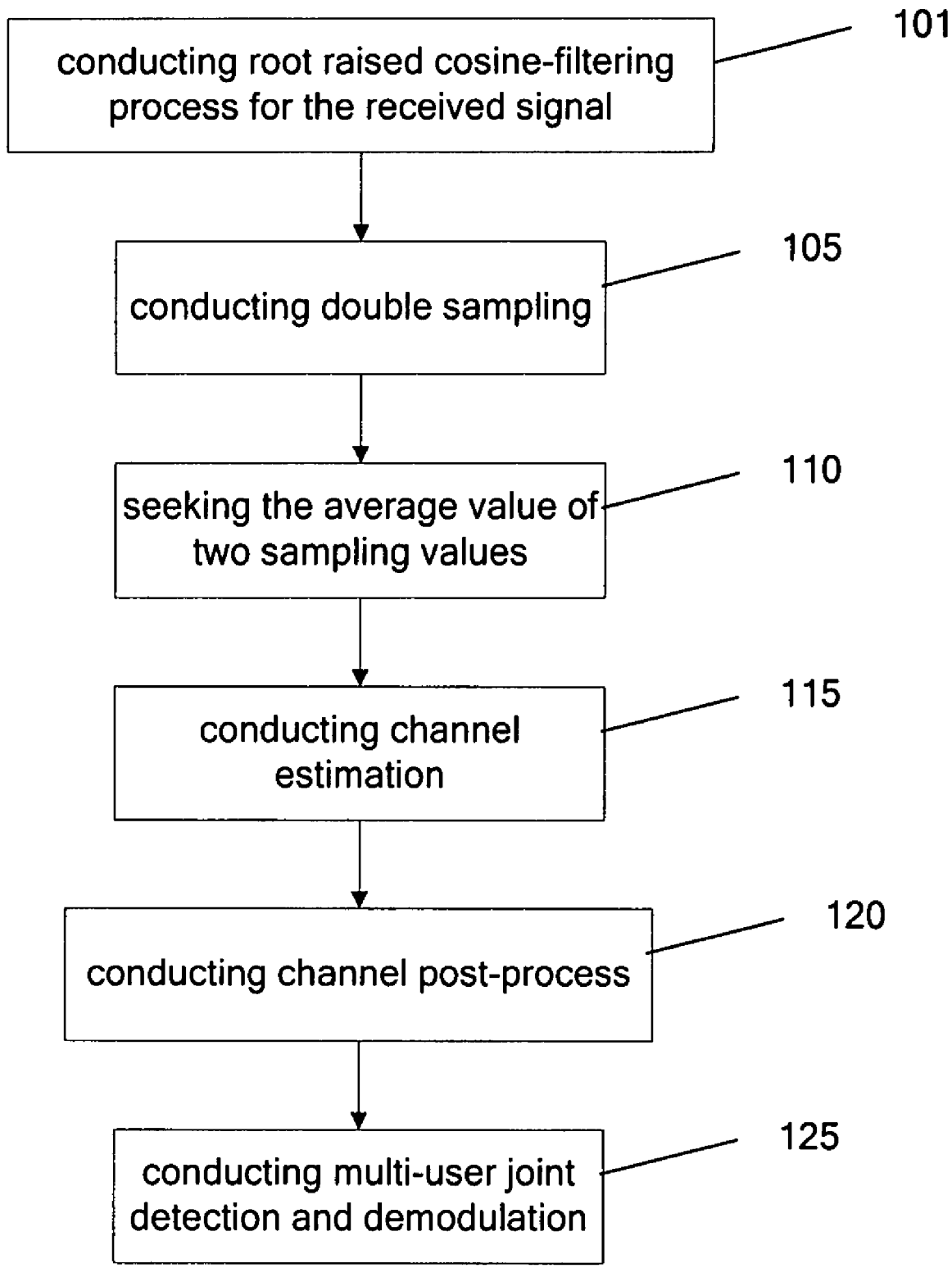
FIG. 1 is a flowchart illustrating the baseband processing method based on double sampling according to one embodiment of the present invention.

FIG. 1 is a flowchart illustrating the baseband processing method based on double sampling according to one embodiment of the present invention, and the present embodiment takes the TD-SCDMA system as an example, and M=4. As shown in FIG. 1, in step 101, received signals are subjected to root raised cosine-filtering process. At a receiving end, the received signals are sent to a root raised cosine-filter corresponding to a sending end to be filtered and then de-multiplexed, and the waveform of each chip is sampled (every ⅛ chip) for $2^{(M-1)}=2^3=8$ times, rendering the values of eight fractional chips. These data constitute data signals for joint detection and demodulation.

Figure 2:
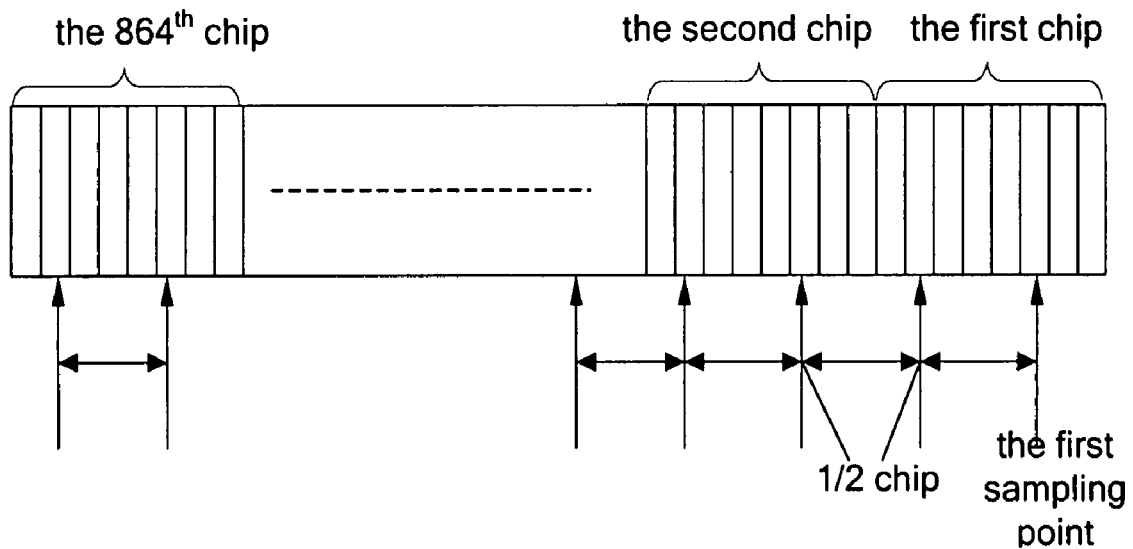
FIG. 2 is a schematic view illustrating that the double sampling of eight fractional chips of one chip is conducted during one time slot in the embodiment as shown in FIG. 1.

In step 105, the above signals are sampled, double sampling is adopted in the present embodiment, and double sampling refers to that two sample values are sampled for each chip, that is, two sample values are selected from the eight sample values of one chip, and the sampling interval is ½ chip, then there are 864×2 sampling points during one time slot. As shown in FIG. 2, one time slot includes 864 chips, and the first sampling point of the first chip can be selected arbitrarily from the first four fractional chips of the first chip, and then with considering the position of the first sampling point as a standard, conduct sampling every other ½ chip. Then in step 110, the average value of the two sampling values of each chip is acquired, that is, conducting equal gain combining, the average value obtained serves as the sampling value of the chip, and the sampling values of each chip are assembled into one data stream.

After the received signals being subjected to the above processes, the signal amplitude can be increased, the noise can be depressed, and the signal-to-noise ratio can be increased, the gain of the signal-to-noise ratio is more than 1 after the digital receiver conducting sampling, meanwhile, the phase difference between the average sampling value and the truth value is not so great, which will not influence the judgment a lot when demodulation is conducted.

Figure 3:
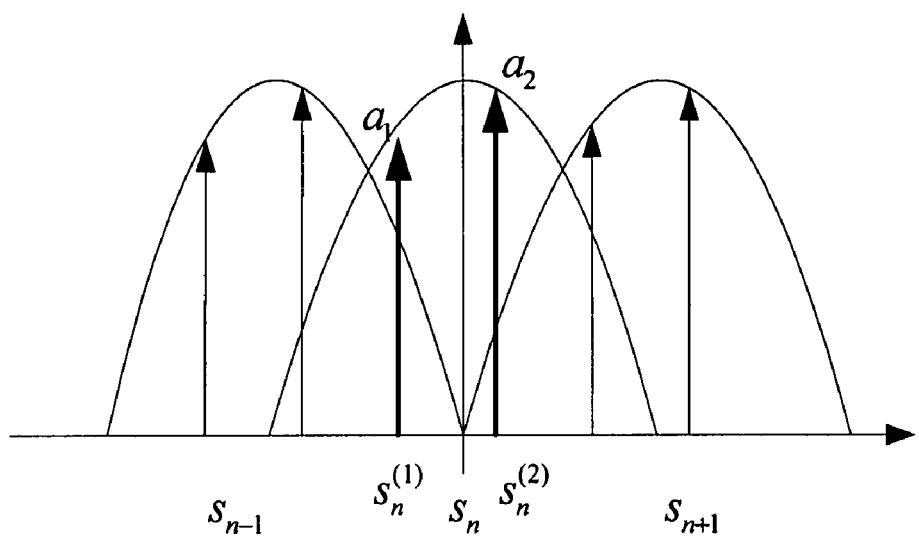
FIG. 3 is a schematic view illustrating the double sampling in the case that interfere and superposition takes place between adjacent chips.

The characteristics of the double sampled signal are analyzed by taking a single user and a single path as an example. As shown in FIG. 3, adjacent chips have interference and superposition, wherein $S_n$ is the $n^{th}$ symbol sent by the user, $S_{n-1}$ is the $(n-1)^{th}$ symbol, $S_{n+1}$ is the $(n+1)^{th}$ symbol, $S_n^{(1)}$ and $S_n^{(2)}$ respectively represent the values of two sampling points at the $S_n$, and $S_n'$ represents the symbol received.

$$S_n^{(1)} = a_1 s_n + (1-a_1)s_{n-1} \quad 1 > a_1 > \tfrac{1}{2}$$

$$S_n^{(2)} = a_2 s_n + (1-a_2)s_{n+1} \quad 1 > a_2 > \tfrac{1}{2}$$

Wherein, $a_1$ refers to the amplitude of $S_n$ in the first sampling point, $a_2$ refers to the amplitude of $S_n$ in the second sampling point, and $s_n'$ can be represented by the following due to the influences of the symbols before and after it:

$$\begin{aligned} s_n' &= s_n^{(1)} + s_n^{(2)} \\ &= a_1 s_n + (1-a_1)s_{n-1} + a_2 s_n + (1-a_2)s_{n+1} \\ &= (a_1+a_2)s_n + (1-a_1)s_{n-1} + (1-a_2)s_{n+1}. \end{aligned}$$

According to the characteristics of the root raised cosine-filter, there is $a_1+a_2 \geq 1.5$. Because of $1>a_1$ and $a_2>0.5$, $0<1-a_1$, $1-a_2<0.5$, $1.5<1+a_1$, $1+a_2<2$, $0<2-a_1-a_2<0.5$, $2a_1+a_2-1>1$, and $a_1+2a_2-1>1$ can be established. Each symbol of $S_{n-1}$, $S_n$ and $S_{n+1}$ has four values, i.e. +1, −1, +j and −j, and there are 64 states, then correspondingly, the received symbol $s_n'$ has 64 values. In such values, there are real numbers and complex numbers, while according to the features of $a_1$ and $a_2$, it can be seen that the modulus of $s_n'/s_n$ is always greater than 1, and even reaches 2, and the value of $s_n'$ calculated each time and the phase of the corresponding $s_n$ keep unchanged or do not change too much. The square of the modulus of $s_n'/s_n$ represents the gain of signal power, thus it can be seen that the gain of the signal-to-noise of the digital receiver is greater than 1 after sampling, and meanwhile, the phase difference between $s_n'$ and $s_n$ is not great, which will not influence the judgment too much when demodulation is conducted.

In step 115, channel estimation is conducted for each user according to the sampled data. A training sequence is separated from the above data stream, and can be represented as:

$$e = Gh + n \tag{1}$$

wherein, the matrix G is a circular dextral matrix composed of base Midamble codes, h is a channel impulsive response of the user, and n is Gaussian white noise.

Then the maximum likelihood estimation h of the channel impulsive response is:

$$\tilde{h} = (G^{*T}G)^{-1}G^{*T}e \tag{2},$$

as the matrix G is a circular dextral matrix, there is:

$$\tilde{h} = G^{-1}e \tag{3}.$$

Hence, the above channel estimation can also be realized by the method of FFT/IFFT, thus improving the arithmetic speed greatly, and the equation is as follows:

$$\tilde{h} = \mathit{ifft}(\mathit{fft}(e)/\mathit{fft}(m)) \tag{4}.$$

Then in step 120, channel post-process is conducted for the estimated channel impulsive response $\tilde{h}$. A threshold value of noise is preset, then the power of each tap of the channel impulsive response $\tilde{h}$ is judged, and if it is more than or equal to the threshold value T of the noise, keep the impulsive response at the position where the tap is; otherwise, set the impulsive response at the position where the tap is as zero. In this case, the channel impulsive response so obtained can be referred to as the post-processing channel impulsive response.

Figure 4:
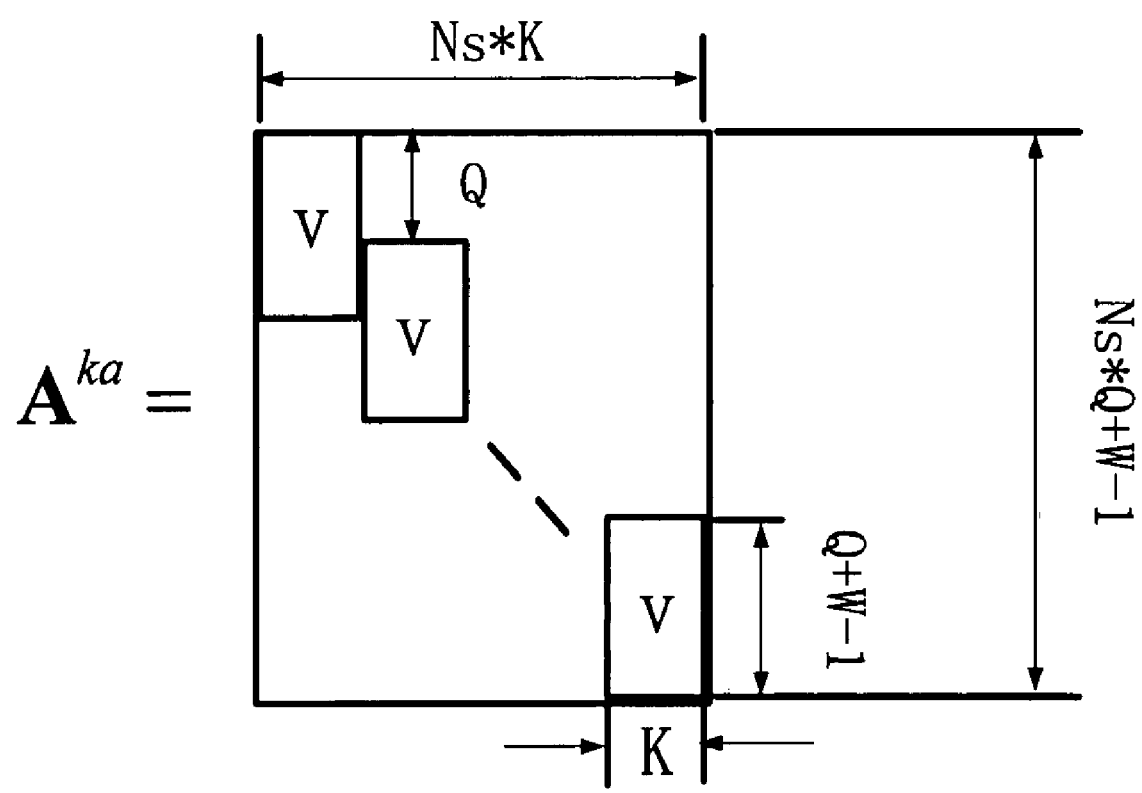
FIG. 4 is a schematic view illustrating the constitution of the system transmission matrix according to the embodiment shown in FIG. 1.

In step 125, multi-user joint detection and demodulation is conducted for the data, and the separation of the data is completed. First, the system transmission matrix A is generated using the respective scrambling codes for spectrum spreading and the post-processing channel impulsive response $\tilde{h}$ of the users. When the user data after subjecting to channelizing and scrambling is transmitted to the receiving end through air channels, the received signal e can be represented as:

$$e = Ad + n$$

wherein d is the column vector composed of the symbols sent by all the users, A is the system transmission matrix generated by using the respective scrambling codes for spectrum spreading and the post-processing channel impulsive responses $\tilde{h}$ of the users. The constitution of the system transmission matrix A is shown in FIG. 4, wherein Ns refers to the number of the symbols sent y the uses, K refers to the number of the users, Q refers to the spectrum spreading factor, and W refers to the window widths of the channel impulsive responses of the users. The system transmission matrix $A^{kw}$ is a diagonal matrix composed of the blocks V (wherein Ka refers to the number of antennas), and the block $V^{ka}$ can be represented as:

$$v[b_1^{ka} b_2^{ka} b_k^{ak}]$$

wherein $b^{ka}_k$ is the convolution of the composite sequence of the scrambling codes for spectrum spreading and the post processing channel impulsive response of the $k^{th}$ user, the dimension is $N(Q+W-1)\times 1$, and can be represented in the form of matrix as follows:

$$b^{ka}_k = c_k \otimes h^{ka}_{ko}$$

wherein $c_k$ is the matrix composed of the composite sequence of the scrambling codes for spectrum spreading of the $k^{th}$ user, and $h^{ka}_k$ is the user post-processing channel impulsive response of the $k^{th}$ user.

And then the system transmission matrix A is used to jointly detect and demodulate the user data, thus obtaining the demodulation data $\hat{d}=(A^H \cdot A)^{-1}A^H e$ of the user. Any of the plural joint detection algorithms such as the white matched filtering (WMF) algorithm, the zero-forcing linear equalization algorithm (ZF) and the minimum mean square error (MMSE) algorithm can be used for data demodulation. Here, the minimum mean square error algorithm is taken as an example, and d is calculated to be:

$$\hat{d}=(A^H R_n^{-1} A + R_d^{-1})^{-1} A^H R_n^{-1} e \qquad (7),$$

thereby rendering the demodulation data of each user, and in the equation (7), Rn refers to the noise-related matrix, and Rd refers to the signal-related matrix.

INDUSTRIAL APPLICABILITY

The present invention can be applied to the base station subsystem of a mobile communication system, such as the base station subsystem of the TD-SCDMA system in particular.

What is claimed is:

1. A baseband processing method based on double sampling includes: subjecting a received signal to a root raised cosine-filter for a filtering process at a receiving end; sampling said signal; conducting channel estimation for every user based on sampled data; and conducting multi-user joint detection and demodulation for said sampled data;

wherein the step of sampling said signal includes: conducting double sampling for said signal, and the interval of the sampling being ½ chip; each chip selecting an average value of two sampling values as a sampling value of the chip; and assembling the sampling values of every chip into one data stream.

2. The baseband processing method according to claim 1, wherein the step of conducting the root raised cosine-filtering process further comprises: filtering and de-multiplexing the received signal; sampling each chip for 2(M−1) times, and then rendering the values of 2(M−1) fractional chips, wherein M is a natural number.

3. The baseband processing method according to claim 1, wherein the step of conducting the double sampling further comprises: selecting anyone of the 2(M−1)12 preceding fractional chips of a first chip as first sampling point; conducting sampling every ½ chip with the position of the first sampling point as a standard.

4. The baseband processing method according to claim 1, wherein the step of conducting the channel estimation further comprises: separating a training sequence from the data stream; obtaining channel impulsive responses of a user according to the training sequence; and conducting channel post-process for the channel impulsive responses.

5. The baseband processing method according to claim 4, wherein the step of conducting the channel post-process further comprises: judging whether the power of each tap of the channel impulsive responses is not less than a set threshold value; if so, keeping the impulsive response at the position where the tap is; otherwise, setting the impulsive response at the position where the tap is as zero.

6. The baseband processing method according to claim 1, wherein the step of conducting the multi-user joint detection and demodulation for the data further comprises: generating a system transmission matrix by using respective scrambling codes for spectrum spreading and channel impulsive responses of the users; jointly detecting and demodulating the data of the user by using the system transmission matrix.

* * * * *